US006237847B1

(12) United States Patent
Milne

(10) Patent No.: US 6,237,847 B1
(45) Date of Patent: May 29, 2001

(54) SYSTEM FOR DETECTING MULTIPLE SUPERPOSED SHEETS

(75) Inventor: Douglas L. Milne, Scotland (GB)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/305,879

(22) Filed: May 5, 1999

(51) Int. Cl.[7] .......... G06F 17/60
(52) U.S. Cl. .......... 235/379; 902/8; 902/13
(58) Field of Search .......... 235/379, 381; 271/3, 14; 902/8, 13, 14, 15, 16, 17, 18

(56) References Cited

U.S. PATENT DOCUMENTS

| | | | | |
|---|---|---|---|---|
| 4,154,437 | | 5/1979 | Butcheck et al. | 271/6 |
| 4,352,559 | | 10/1982 | Gorgone et al. | 356/71 |
| 4,501,416 | * | 2/1985 | Hain | 271/3.1 |
| 4,513,439 | | 4/1985 | Gorgone et al. | 382/7 |
| 4,577,763 | * | 3/1986 | Placke et al. | 209/534 |
| 4,815,015 | | 3/1989 | Milne . | |

FOREIGN PATENT DOCUMENTS 0335561 10/1989 (EP) .
0344938 12/1989 (EP) .

* cited by examiner

*Primary Examiner*—Karl D. Frech

(57) ABSTRACT

A system is for detecting the passage of multiple sheets along a feed path. The system includes a sensing station (12) through which the feed path passes and which has a light emitter (48) and an optical sensor (50) arranged to sense light transmitted from the light emitter through an item comprising a single or multiple sheet present at the sensing station. The optical sensor (50) provides a voltage output whose magnitude is dependent on the intensity of the transmitted light received by the optical sensor. This output is applied to the first input (58) of a log ratio amplifier (60). A voltage representative of the output of the optical sensor when no item is present at the sensing station (10) is applied to the second input of the amplifier (64). The output of the amplifier (60) is applied to data processing means (52) which then determines whether a single or multiple item is present at the sensing station. This system can be used in place of more complicated and expensive multiple sheet detect systems such as those incorporating co-operating rollers.

12 Claims, 2 Drawing Sheets

SYSTEM FOR DETECTING MULTIPLE SUPERPOSED SHEETS

BACKGROUND OF THE INVENTION

This invention relates to an apparatus for detecting the passage of multiple superposed sheets along a feed path. The invention has application, for example, to an apparatus for detecting the passage of superposed currency notes in an automated teller machine (ATM).

In a cash dispensing mechanism of an ATM, it is important to provide a simple and reliable means for detecting when a currency note has become superposed on another in a path of travel from a currency supply means to a note exit slot, since such superpositioning may produce an undesirable result such as the dispensing of an excessive amount of money. For convenience, two or more sheets or notes which have become disposed in a superposed relationship will hereinafter be referred to as a multiple sheet or a multiple note.

A known system for detecting multiple sheets includes a sensing station in a feed path for the sheets. The sensing station includes a light emitter and an optical sensor arranged to sense light from the emitter transmitted through an item comprising a single or multiple sheet present at the sensing station. The optical sensor provides an output voltage whose magnitude is dependent on the intensity of the transmitted light received by the optical sensor. The output voltage of the optical sensors is applied to a processing circuit, and on the basis of this voltage the processing circuit provides an output indicative of whether a single sheet or a multiple sheet is present at the sensing station.

With this known system problems have been experienced in reliably distinguishing between a single bank note and a double bank note, and between a single clean bank note and a single soiled bank note. The reason for this is that the voltage output of the optical sensor when the light incident on it has passed through one note is typically 20% of the output of the optical sensor when light from the emitter has reached the sensor directly (i.e. with no note present at the sensing station), and that the voltage output of the optical sensor when the incident light has passed through two notes is typically only 20% of the output of the sensor when the incident light has passed through one note. For example, if the output of the sensor when no note is present at the sensing station is 5 volts, the output of the sensor with one note present would typically be 1 volt and the output with 2 notes present would typically be 0.2 volt. It is seen that there is a relatively large difference between the sensor outputs for no and one note present, but a relatively small difference between the sensor outputs for 1 and 2 notes present. Thus, there is not a very clearly defined difference as regards the sensor output for single and multiple notes, and the very low sensor output for a multiple note may approach the noise level of an analog to digital (A/D) converter included in the circuit used to process the output of the sensor.

Another known system for detecting multiple sheets is disclosed, for example, in EP-B-0344938. This system includes first and second co-operating rollers between which sheets pass as they are fed along a feed path, the first roller having a fixed axis of rotation, and the second roller being resiliently urged towards the first roller so as to enable it to be moved away from the first roller as a single or multiple sheet passes between the rollers. A voltage generating means associated with the second roller produces an output voltage which varies linearly with movement of the second roller towards or away from the first roller, and this output voltage is applied to a processing circuit which determines whether a single or multiple sheet has passed between the rollers. This known system has the disadvantage that it is relatively complicated compared with the known multiple sheet detector system using an optical sensor.

SUMMARY OF THE INVENTION

It is an object of the invention to provide a system for detecting multiple sheets which is of simple construction and in which the above-mentioned problems of the known system employing an optical sensor are alleviated.

According to the invention there is provided a system for detecting the passage of multiple superposed sheets along a feed path, said system including a sensing station through which said feed path passes and which has a light emitter and an optical sensor arranged to sense light from said light emitter transmitted through an item comprising a single or multiple sheet present at said sensing station, said optical sensor providing a voltage output whose magnitude is dependent on the intensity of the transmitted light received by said optical sensor, characterized by a log ratio amplifier having first and second inputs and an output, the output of said optical sensor being applied to said first input, and a voltage representative of the output of said optical sensor when no item is present at said sensing station being applied to said second input; and data processing means to which the output of said amplifier is applied, said data processing means being arranged to make a determination as to whether a single or multiple item is present at said sensing station on the basis of the output of said amplifier.

It should be understood that by a log ratio amplifier is meant an operational amplifier circuit having two inputs and an output, and the output voltage of which is proportional to the log of the ratio of input voltages respectively applied to the two inputs.

Preferably, in a system in accordance with the invention, the output of the log ratio amplifier varies linearly in dependence on whether no, one or two sheets are present at the sensing station.

Also, preferably in a system in accordance with the invention, in the event of a multiple sheet being present at the sensing station the processing means makes a determination as to whether the multiple sheet comprises 2 sheets or 3 sheets.

It should be understood that the ability of such system to determine the number of sheets making up a detected multiple sheet is of importance, since when it is used in a cash dispensing mechanism, for example, it enables a record to be kept of the number of notes making up a multiple note which will normally be diverted to a reject bin. Such record will assist in reconciliation procedures when the bin is emptied. In operation of a cash dispensing mechanism, it is very unlikely that a multiple note would comprise more than 3 notes.

BRIEF DESCRIPTION OF THE DRAWINGS

One embodiment of the invention will now be described by way of example with reference to the accompanying drawings in which.

DETAILED DESCRIPTION

Figure 1:
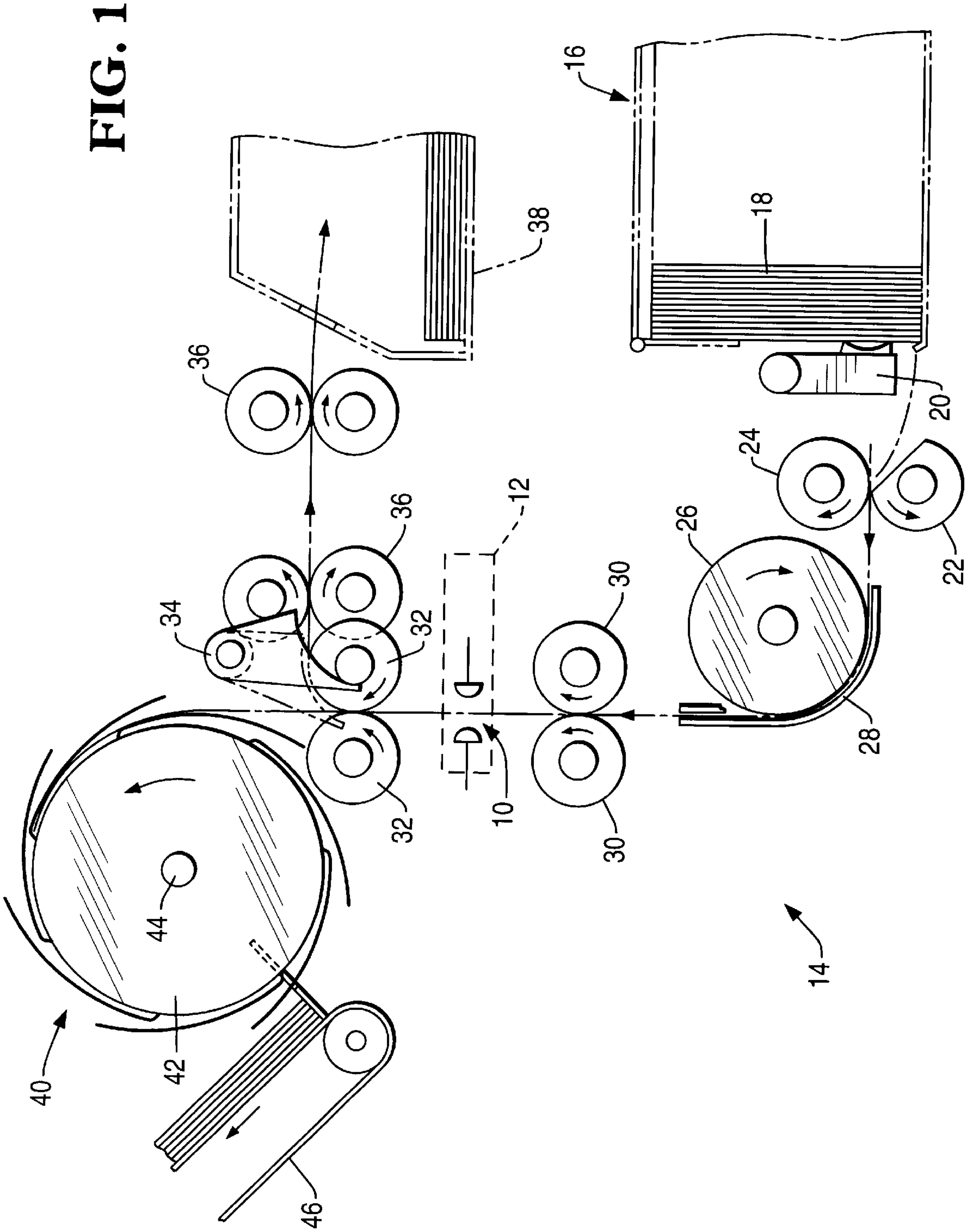
FIG. 1 is a schematic view of part of a cash dispensing mechanism including a multiple note detecting system in accordance with the present invention.

Referring now to FIG. 1, the multiple note detecting means includes an optical system 10 provided at a sensing station 12 included in a cash dispensing mechanism 14 of an ATM. The cash dispensing mechanism 14 includes a currency cassette 16 arranged to contain a stack of currency notes 18 of the same pre-determined denomination supported on their long edges. The cassette 16 is associated with a pick mechanism 20. When one or more currency notes are to be dispensed from the cassette 16 in the course of a cash dispensing operation, the pick mechanism 20 draws out notes one by one from the stack 18, and each note is fed by feed rolls 22, 24, 26 via guide means 28 to feed rolls 30. The direction of feed of the notes is at right angles to their long dimensions. It should be understood that the cash dispensing mechanism 14 could include more than one cassette each associated with a pick mechanism, but in the present embodiment only one cassette and pick mechanism will be described.

Each picked note is passed through the sensing station 12 by the feed rolls 30 and by further feed rolls 32. If a multiple note is detected by the optical system 10 (in a manner to be described in more detail later) then a divert gate 34 diverts the multiple note via rolls 36 into a reject bin 38.

If a single note is detected then the note passes on to a stacking wheel 40 to be loaded on to stationary belt means 46. The stacking wheel 40 comprises a plurality of stacking plates 42 spaced apart in parallel relationship along the shaft 44 of the stacking wheel 40. When the required number of notes have been loaded on to the belt means 46, the belt means 46 transports the notes to a cash delivery slot (not shown).

Figure 2:
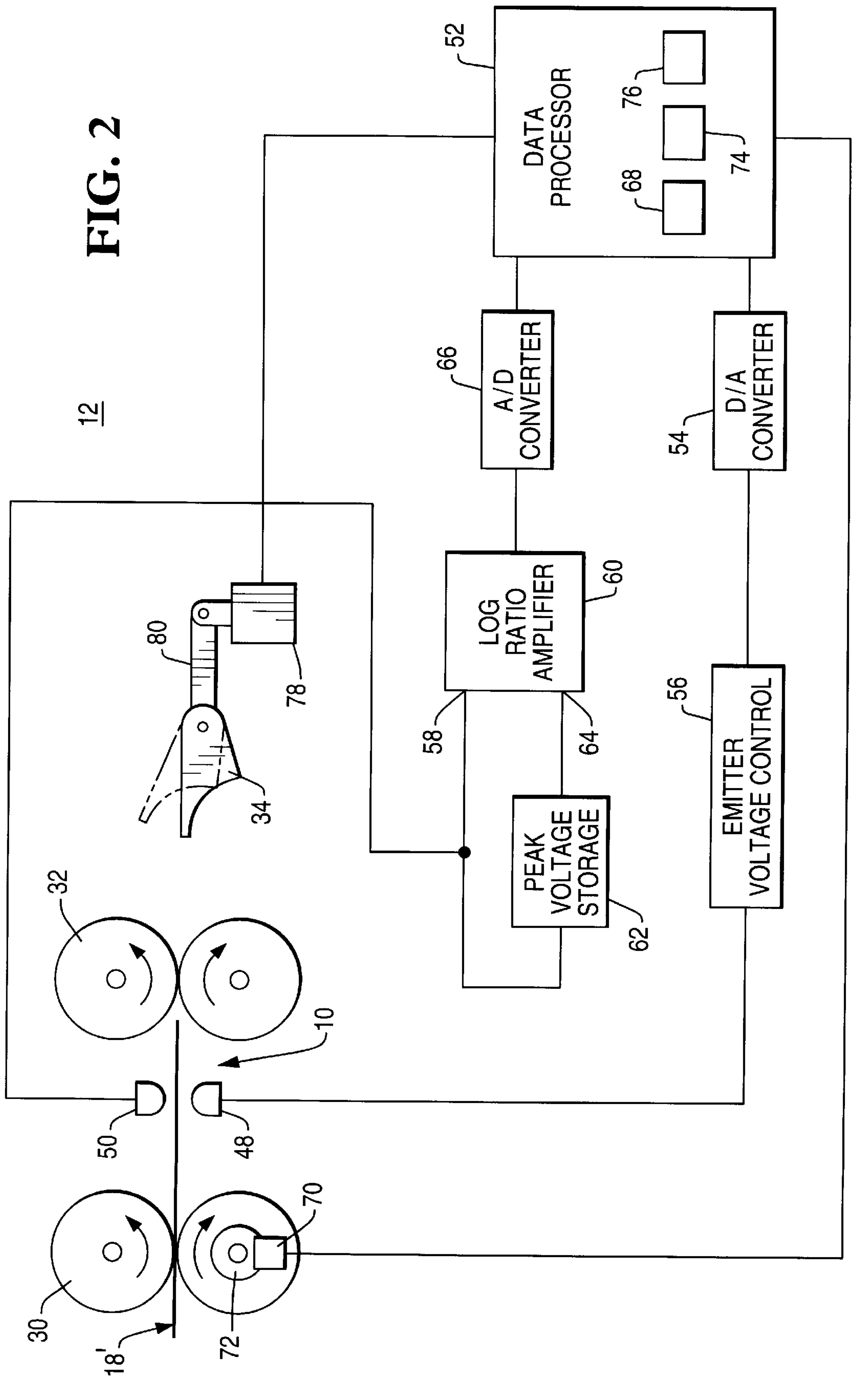
FIG. 2 is partly a schematic view and partly a block diagram of the multiple note detecting system and associated divert means.

Referring to FIG. 2, the optical system 10 comprises an LED 48 as light emitter and an optical sensor 50 in the form of a photo-transistor 50. A data processing means 52 controls the voltage output to the emitter 48 by means of a digital to analog (D/A) converter 54 in association with a suitable emitter voltage control circuit 56. The optical sensor 50 is arranged to receive light directly from the emitter 48 if no note present at the sensing station 12, or light from the emitter 48 transmitted through a single or multiple note 18' present at the sensing station 12. The output voltage of the sensor 50 is dependent on the intensity of the light from the emitter 48 incident on the sensor 50. This output voltage is applied to a first input 58 of a log ratio amplifier 60 and to a peak voltage capacitive storage means 62. The storage means 62 includes a capacitor (not shown) which temporarily stores a voltage corresponding to the peak output of the sensor 50, and this stored peak voltage is applied to the second input 64 of the amplifier 60. The output of the amplifier 60 is connected to the data processing system 52 via an A/D converter 66.

It will be appreciated that the peak voltage stored in the storage means 62 corresponds to the output of the optical sensor 50 when no note is present at the sensing station 12, i.e. when the intensity of the light received by the sensor is at a maximum. The stored voltage serves as a reference voltage as far as the operation of the log ratio amplifier 60 is concerned. Although the voltage stored in the storage means 62 tends to decay, at the commencement of each transaction involving the cash dispensing mechanism 14 the emitter 48 is switched on thereby causing the optical sensor 50 to produce its maximum output voltage. This maximum output voltage serves to refresh the voltage stored in the storage means 62 thereby restoring this last mentioned voltage to its peak value. Thus in operation of the log ratio amplifier 60, a reference voltage corresponding to the peak output of the sensor 50 will be applied to the input 64 of the amplifier 60.

The voltage output (Vout) from the amplifier 60 is given by the following formula:

Vout=A.log Vref/Vinput where

Vref is the reference voltage;

Vinput is the voltage output of the optical sensor 50 applied directly to the input 58 of the amplifier 60; and A is a constant representative of the gain of the amplifier 60.

Since the output of the sensor 50 is reduced by substantially the same fraction (e.g. ⅕) for each additional note present at the sensing station 12, the output of the log ratio amplifier 60 is proportional to the number of notes present at the sensing station 12.

In the present embodiment, the value of "A" is chosen so that for a reference voltage of 5 volts the output from the log ratio amplifier 60 is 1 volt for one note present at the sensing station 12, 2 volts for two notes present at the sensing station 12, 3 volts for three notes present at the sensing station 12, and so on. When no note is present at the sensing station 12 the output of the amplifier 60 will be zero.

When a single or multiply note fed along the feed path 28 reaches the optical system 10, the output voltage of the sensor 50 falls because the light reaching it is now passing through the single or multiple note, thereby causing the output voltage from the amplifier 60 to rise to at least 1 volt. The output of the log ratio amplifier 60 is fed to the A/D converter 66 which causes a digital representation of this output to be stored in a memory location 68 in the data processing means 52. As the single or multiple note progresses through the sensing station 12, further readings of the log ratio output are taken and stored in the memory location 68 under the control of the data processing means 52. These additional readings are taken at regular intervals (every millimeter, for example) across the width of the note. The timing of these readings is determined by timing pulses generated by a sensor 70 associated with a timing disc 72 attached to one of the transport rollers 30, the sensor 70 being connected to the data processing means 52. The reading and storing stops when the output voltage of the log ratio amplifier 60 falls back to 0 volts (i.e. when the single or multiple note leaves the optical system 10). The data processing means 52 then totals the stored digital representations of the sampled outputs of the log ratio amplifier 60 while the single or multiple note is passing through the sensing station 12 so as to produce a summation value representative of the average thickness of the note across its width. It will be appreciated that this summation procedure averages out darker or lighter areas or areas of soiled spots. Under normal conditions with clean currency, two notes superposed on one another have a summation value twice that of a single note, triple notes have a summation value three times the value of a single note, etc. The data processing means 52 compares the summation value with the contents of a look-up table held in a memory location 74 of the data processing means 52 in order to determine, if possible, the number of notes which just passed through the sensing. The contents of the look-up table in the memory location 74 comprise three discrete ranges of values respectively corresponding to 1, 2 and 3 notes. If the summation value generated by the data processing means 12 falls within any one of these ranges, then the appropriate determination is made of the number of notes comprising the single or multiple note that has just passed through the sensing station 12. If the summation value does not match any of the ranges in the look-up table, then it is assumed that the sensed note is a multiple note made up of an indeterminate number of notes. It will be understood that, in a normal pick operation, the pick mechanism 20 picks a single currency note from the currency cassette 16 for feeding to the stacking wheel 40 (see FIG. 1). If the data processing means 52 determines that a single note has been sensed, then the divert gate 34 remains in its home position as shown in solid outline in FIG. 1, thereby enabling the note to be fed to the stacking wheel 40 for stacking on the belt means 46 and transportation to the cash delivery slot.

When a double or triple note is detected, the number of notes detected is stored in a memory location 76 in the data processing means 52. These stored numbers can be used for reconciliation purposes when the reject bin 38 (see FIG. 1) is emptied.

The data processing means 52 also controls the position of the divert gate 34 by means of a solenoid 78 and connecting means 80. Thus, if a multiple note is detected, then the data processing means 52 moves the gate 34 into its activated position shown in chain outline in FIG. 1 so that the multiple note is diverted into the reject bin 38.

Although the preferred embodiment shows notes of the same pre-determined denomination in a single cassette, it can be applied to a cash dispensing mechanism involving a plurality of denominations. Different types of currency notes would give rise to different summation values representative of the average thickness of the notes taken across their width. The currency types could be given appropriate ranges in the look-up table held in memory location 74 of the data processing means 52, so that the multiple note detect system can deal with notes of different denominations.

Since the output of the log ratio amplifier 60 is proportioned to the number of notes present at the sensing station, with for example the difference in output between no note present and one note present, being the same as that between one note present and two notes present, the system described above can reliably distinguish between single and multiple notes. Also, the system can reliably distinguish for example between double and triple notes, which is of help in connection with reconciliation procedures. The inherent reliability of this system is sufficiently good that the system can be used in place of more complicated and expensive multiple sheet detect systems such as those incorporating co-operating rollers.

What is claimed is:

1. An automated teller machine (ATM) comprising:

a storage cassette for storing bank notes;

a picker mechanism for picking bank notes from the storage cassette;

a stacker mechanism for forming picked notes into a stack;

a feeder mechanism for feeding picked bank notes to the stacker mechanism;

a first circuit for (i) detecting an item comprising a number of picked bank notes being fed to the stacker mechanism, and (ii) providing a first output signal which varies dependent upon whether the detected item comprises one or two bank notes; and a second circuit for processing the first output signal to provide a second output signal which varies linearly dependent upon whether the detected item comprises one or two bank notes.

2. An ATM according to claim 1, wherein the first output signal varies nonlinearly dependent upon whether the detected item comprises one or two bank notes.

3. An ATM according to claim 1, wherein the first circuit includes (i) a light emitter for transmitting light through the detected item, and (ii) an optical sensor for sensing light from the light emitter transmitted through the detected item, the optical sensor providing a voltage output having a magnitude dependent on the intensity of the transmitted light received by the optical sensor.

4. An ATM according to claim 3, wherein the light emitter is a light emitting diode, and the optical sensor is a phototransistor.

5. An ATM according to claim 3, wherein the second circuit includes a log ratio amplifier having first and second inputs and an output, the output of the optical sensor being applied to the first input, a voltage representative of the output of the optical sensor when no item is detected being applied to the second input.

6. An ATM according to claim 5, wherein the second circuit includes a data processor for (i) receiving the output of the amplifier, and (ii) making a determination as to whether one or two bank notes is detected on the basis of the output of the amplifier.

7. An ATM according to claim 5, wherein the output of the log ratio amplifier changes linearly with respect to the number of bank notes detected.

8. An ATM according to claim 5, wherein the second circuit includes a peak voltage storage device for storing a peak voltage output of the optical sensor, the peak voltage output being applied to the second input of the log ratio amplifier.

9. An automated teller machine (ATM) comprising:

a storage cassette for storing bank notes;

a picker mechanism for picking bank notes from the storage cassette;

a stacker mechanism for forming picked notes into a stack;

a feeder mechanism for feeding picked bank notes to the stacker mechanism;

a detector for (i) detecting presence of an item comprising a number of picked bank notes being fed to the stacker mechanism, and (ii) providing a first output signal indicative thereof, the detector including a sensing station including a light emitter and an optical sensor for sensing light from the light emitter transmitted through an item comprising a single or multiple bank note present at the sensing station, the optical sensor providing a voltage output having a magnitude dependent on the intensity of the transmitted light received by the optical sensor; and a circuit for (i) providing a second output signal in response to the first output signal such that the second output signal varies linearly dependent upon whether the detected item comprises no, one, or two bank notes, the circuit including a log ratio amplifier having first and second inputs and an output, the output of the optical sensor being applied to the first input, a voltage representative of the output of the optical sensor when no item is present at the sensing station being applied to the second input.

10. An ATM according to claim 9, wherein the circuit includes a data processor for (i) receiving the output of the amplifier, and (ii) making a determination as to whether a single or multiple bank note is present at the sensing station on the basis of the output of the amplifier.

11. An ATM according to claim 9, wherein the output of the log ratio amplifier changes linearly with respect to the number of bank notes present at the sensing station.

12. An ATM according to claim 9, wherein the circuit includes a peak voltage storage device for storing a peak voltage output of the optical sensor, the peak voltage output being applied to the second input of the log ratio amplifier.

* * * * *